(12) United States Patent
Lehmann et al.

(10) Patent No.: US 7,868,594 B2
(45) Date of Patent: Jan. 11, 2011

(54) GENERATING UNIT AND METHOD FOR PRODUCING A CURRENT WITH A PREDETERMINED NETWORK FREQUENCY

(75) Inventors: Christoph Lehmann, Neukirchen-Vluyn (DE); Peter Növer, Mönchengladbach (DE); Armin de Lazzer, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 11/794,791

(22) PCT Filed: Nov. 10, 2005

(86) PCT No.: PCT/EP2005/055882

§ 371 (c)(1),
(2), (4) Date: Mar. 24, 2008

(87) PCT Pub. No.: WO2006/072498

PCT Pub. Date: Jul. 13, 2006

(65) Prior Publication Data

US 2008/0303279 A1   Dec. 11, 2008

(30) Foreign Application Priority Data

Jan. 7, 2005   (EP) .................................. 05000257

(51) Int. Cl.
H02P 9/00 (2006.01)
(52) U.S. Cl. ............................................ 322/44; 290/5
(58) Field of Classification Search .................. 290/5; 322/44

See application file for complete search history.

(56) References Cited

U.S. PATENT DOCUMENTS

| | | | | |
|---|---|---|---|---|
| 2,752,515 | A * | 6/1956 | Baudry et al. .................. | 310/55 |
| 3,082,337 | A * | 3/1963 | Horsley ....................... | 310/179 |
| 3,529,192 | A * | 9/1970 | Davies ........................ | 310/179 |
| 3,859,578 | A * | 1/1975 | Botvinnik et al. ........... | 318/732 |
| 4,459,504 | A * | 7/1984 | Weldon et al. .............. | 310/243 |
| 4,694,189 | A * | 9/1987 | Haraguchi et al. ........ | 290/40 C |
| 4,754,156 | A * | 6/1988 | Shiozaki et al. ............... | 290/52 |

(Continued)

FOREIGN PATENT DOCUMENTS

BE   898244 A  *  3/1984

(Continued)

OTHER PUBLICATIONS

BE 898244 A computer translation Description.*

*Primary Examiner*—Joseph Waks

(57) ABSTRACT

A drive is embodied to drive a rotor at a variable rotational frequency; the rotor has a winding that is embodied to produce a rotary field magnetomotive force of a generator, with a rotor rotary field frequency which is variable in relation to the rotor; the frequency converter is electrically connected to the rotor winding; a regulating device comprises a recording element for measuring values of the generator, a calculating unit for a generator simulation, and a transmitter for transmitting a control signal to the frequency converter; and, on the basis of the control signal, an electrical excitation of the rotor winding can be triggered by the frequency converter in such a way that a pre-determined stator rotary field frequency is present in the event of a variable rotational frequency of the rotor and a variable rotor rotary field frequency.

15 Claims, 2 Drawing Sheets

U.S. PATENT DOCUMENTS

| | | | |
|---|---|---|---|
| 4,920,277 A * | 4/1990 | Kuwabara et al. | 290/40 C |
| 5,561,358 A * | 10/1996 | Kuwabara et al. | 318/799 |
| 6,605,928 B2 * | 8/2003 | Gupta et al. | 322/10 |
| 7,029,339 B2 * | 4/2006 | Brach et al. | 440/6 |
| 7,554,302 B2 * | 6/2009 | Schauder | 322/44 |
| 2006/0113800 A1 * | 6/2006 | Willisch et al. | 290/44 |
| 2008/0093854 A1 * | 4/2008 | Bucker et al. | 290/44 |
| 2008/0150282 A1 * | 6/2008 | Rebsdorf et al. | 290/44 |

FOREIGN PATENT DOCUMENTS

| | | | |
|---|---|---|---|
| DE | 3400754 A | * | 7/1984 |
| DE | 19533950 A1 | * | 3/1997 |
| WO | WO 2004/030199 A2 | | 4/2004 |

\* cited by examiner

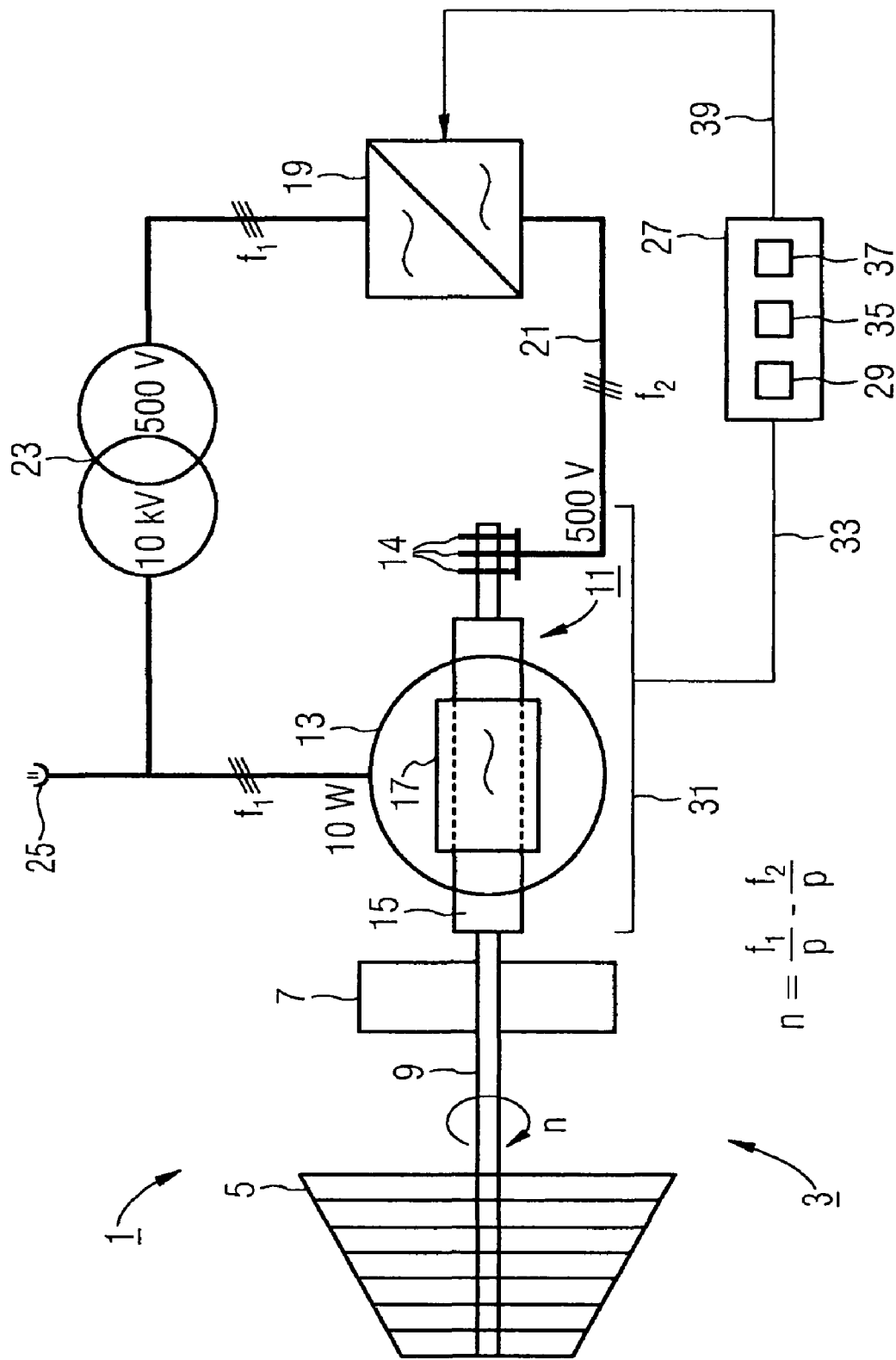

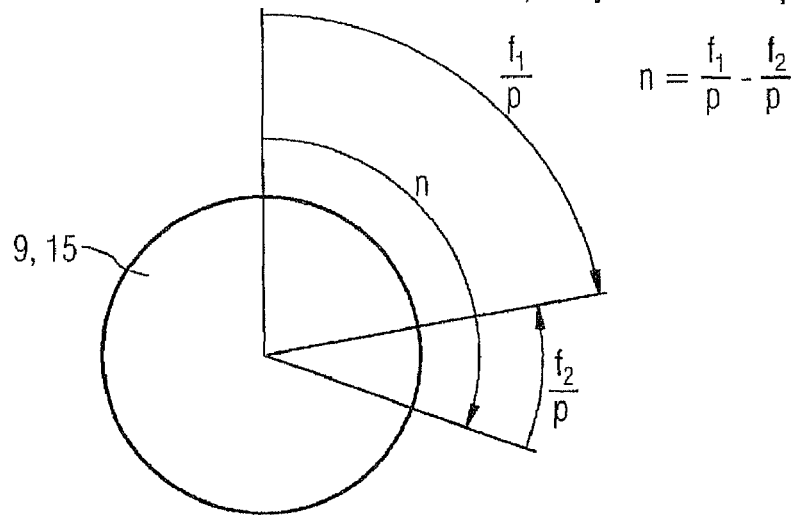
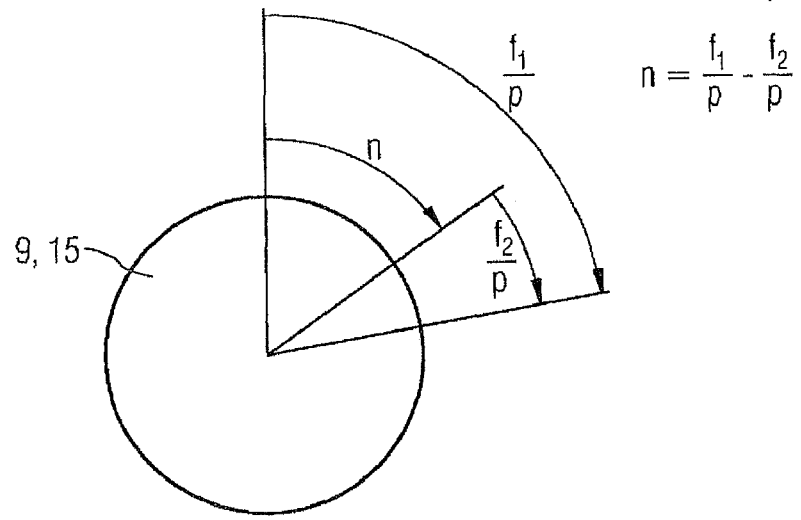

GENERATING UNIT AND METHOD FOR PRODUCING A CURRENT WITH A PREDETERMINED NETWORK FREQUENCY

CROSS REFERENCE TO RELATED APPLICATIONS

This application is the US National Stage of International Application No. PCT/EP2005/055882, filed Nov. 10, 2005 and claims the benefit thereof. The International Application claims the benefits of European application No. 05000257.5 filed Jan. 7, 2005, both of the applications are incorporated by reference herein in their entirety.

FIELD OF INVENTION

The invention relates to a generating unit having a drive, a generator with a stator and a rotor, and a frequency converter, as well as a method for producing a current with a predetermined network frequency.

BACKGROUND OF THE INVENTION

Conventional generating units use a generator in the form of a synchronous machine. Here, the electrical power is provided by the fixed generator part (stator). The shaft train driving the generator is identical to the shaft train of the drive, which is constructed in the form of a turbine, for example. The shaft train is in the generator part of a rotor with a rotor winding, which generates a magnetic excitation field, which rotates uniformly with the rotor and therefore with the speed of the drive. A rotary field magnetomotive force, which is stationary with respect to the rotating rotor, is thus produced in the generator, i.e. the rotary field magnetomotive force rotates at the same speed as the drive and the rotor. As the abovementioned shaft train (of the drive and of the rotor) rotates at network frequency in the case of a two-pole synchronous machine, for example, or at a fraction of the network frequency in the case of synchronous machines with a higher number of poles, the rotary field magnetomotive force is produced with a rotary field frequency of the same magnitude as the network frequency. That is to say, network-frequency alternating current is induced in the stator. However, because of this process, the speed of the shaft train is permanently coupled to the network frequency. This significantly restricts flexibility in the design of the torque-producing components—therefore of the drive, e.g. in the form of a gas, steam or water turbine or a piston engine or other drive unit.

To avoid this disadvantage, in the case of small generator powers, it has previously been possible to connect gearboxes between the drive and the generator. Other solutions provide for the whole outgoing power of the generator to be matched to the network frequency by electronic conversion by means of a network frequency converter. However, neither approach is suitable for high output powers. Gearbox solutions are conceivable up to powers of about 80 MW. Conversion of the full power of a generator has been realized up to about 25 MW depending on speed.

A further possibility consists in designing a generator working as a synchronous machine for an output frequency, which deviates from the required network frequency. In order to bring the output frequency to the network frequency, an electric motor, which rotates at network frequency or a fraction thereof, is operated directly by the generator and is driven by the generator in synchronous mode. For its part, the motor supplies network frequency. This procedure is capital-intensive and prone to losses, however, so that only unsatisfactory efficiencies can be achieved.

In summary, therefore, with high generator powers, the drive must necessarily rotate at network frequency or a fraction thereof, which constitutes an undesirable constraint when producing current by means of a generating unit.

It would be desirable to achieve a decoupling of drive and generator even at any predetermined network frequency.

SUMMARY OF INVENTION

It is at this point that the invention is applied, the object of which is to specify a device and a method with which current can be produced at any predetermined network frequency at which the drive and the generator are decoupled with regard to a frequency rating.

With regard to the method, the object is achieved by a method of the kind mentioned in the introduction, in which, in a generator having a rotor and a stator, a rotor winding is driven at a variable rotational frequency (n);

measuring values of the generator are recorded, the generator is simulated, and a control signal is transmitted; and on the basis of the control signal, an electrical excitation of the rotor winding is triggered in such a way that, in the event of a variable rotational frequency of the rotor, a rotary field magnetomotive force of the generator is produced by the rotor winding at a rotor rotary field frequency, which is variable in relation to the rotor, in such a way that a predetermined stator rotary field frequency is established.

In other words, the variable rotational frequency of the rotor is compensated for by a regulating device, which excites the rotor winding in such a way that a rotary field magnetomotive force of the generator leads to a predetermined stator rotary field frequency by means of a rotor rotary field frequency, which is variable in relation to the rotor. Expressed as a formula:

$$n = \frac{f_1 - f_2}{p}$$

where n is the rotational frequency of the rotor, $f_1$ is the stator rotary field frequency, i.e. the frequency of the rotary field magnetomotive force permeating the stator, $f_2$ is the rotor rotary field frequency, i.e. the resulting frequency relative to the rotor speed of the rotary field magnetomotive force produced by the rotor winding, and p is the number of pairs of poles of the generator.

With regard to the device, the object is achieved by the invention with a generating unit of the kind mentioned in the introduction comprising:

a drive, a generator with a stator and a rotor, and a frequency converter, wherein, according to the invention:

the drive is embodied in such a way as to drive the rotor at a variable rotational frequency;

the rotor has a rotor winding that is embodied in such a way as to produce a rotary field magnetomotive force of the generator with a rotor rotary field frequency, which is variable in relation to the rotor;

the frequency converter is electrically connected to the rotor winding;

a regulating device comprising a recording element for measuring values of the generator, a calculating unit for a generator simulation, and a transmitter for transmitting a control signal to the frequency converter is provided; wherein on the basis of the control signal, an electrical excitation of the rotor winding can be triggered by the frequency converter in such a way that a predetermined stator rotary field frequency is present in the event of a variable rotational frequency of the rotor and a variable rotor rotary field frequency.

At the same time, the invention starts from the consideration that, due to the use of an excitation concept in which an excitation field is produced, which is not fixed with respect to the rotor but rotates with respect to the rotor in the form of a rotary field magnetomotive force, in particular a predetermined network frequency can be produced in the stator of the generator by a stator rotary field frequency, which is predetermined. In other words, this can come about in that the difference between a rotational speed (rotational frequency) of the shaft (rotor) carrying the excitation winding (rotor winding) and the rotational speed (rotor rotary field frequency) of the excitation field (rotary field magnetomotive force) is adjusted relative to the rotor or to the shaft of the drive. The frequency with which the generator outputs its power is decoupled from the rotational frequency of the drive providing the power by a suitable electronic regulation of the excitation.

At the same time, the invention starts from the knowledge that, with regard to its basic construction, a generator to be provided for this purpose as part of the generating unit constitutes a mixture of synchronous machine and asynchronous machine. In operation, the generator is operated extensively synchronously. A method of operation as is known with motors, for example, similar to an asynchronous machine, which is in principle possible, would be disadvantageous. In this case, the generator would namely have to be provided in the form of an asynchronous machine with short-circuit (squirrel-cage) rotor, with which the frequency converter (inverter) would have to convert the entire power given out by the stator of the generator. For this purpose, a frequency converter would have to be disadvantageously overrated with regard to its size. On the other hand, the concept according to the invention provides that the frequency converter is electrically connected to the rotor winding so that only the rotor power has to be converted for electrically exciting the rotor winding to produce the rotary field magnetomotive force at the variable rotor rotary field frequency. As with a conventional synchronous machine with the predetermined stator rotary field frequency as network frequency, the stator power can be made directly accessible to the network.

The proposed concept is particularly suitable for use in the power station sector and also in areas where the proposed generating unit is used as a peak-load device or as a mobile power generating unit. Especially in the latter case, the clearly better dynamic behavior of the drive and the generator effected due to the concept according to the invention is namely of advantage, wherein however a pre-defined stator rotary field frequency can be provided for a network mode, which does not necessarily have to fulfill the stability requirements of large power networks. A further advantage of the present concept consists in the fact that the proposed generating unit enables a particularly wide-band production of rotor voltages on the one hand and stator voltages on the other. The generating unit can therefore advantageously be used with moderate rotor voltages in the sub-kilovolt range to provide particularly high stator voltages in the range of 10 kV or more, for example with a power output in the kilowatt to 100 kilowatt range. In each case, the frequency converter (inverter) could be designed in a particularly compact and cost-effective manner, as it only has to convert the rotor power. That is to say that, compared with a state-of-the-art design in which the whole outgoing power of the generator is usually converted, there is the advantage that the electrotechnical control components have to convert a lower power. Quite generally, the speed of the shaft generating the power, i.e. the speed of the drive, can be selected to be independent of the network frequency and yet any constant or even variable stator rotary field frequency can be achieved. This allows the construction of the drive components to be more efficient and more compact. For example, with a super-synchronous operation of the generator, gearbox input drive speeds of more than 3,000 rpm or 3,600 rpm respectively can thus be realized—this corresponds to the synchronous speeds of two-pole rotary field machines at 50 Hz and 60 Hz network frequency respectively. With a four-pole generator, the abovementioned rpm figures are half as big, and with a six-pole generator the abovementioned rpm figures must be divided by three.

Unlike a purely synchronous machine, with the concept of an adjustable synchronous machine according to the invention presented here, the rotary field electromotive force can therefore be influenced directly with regard to its rotary field frequency effective for the stator. With appropriate regulation, this results not only in a considerably better dynamic behavior, but also allows a unit to be built for different or variable or possibly strongly transient network frequencies within the framework of network fluctuations. The generating unit according to the concept according to the invention is therefore primarily matched to the network frequency by means of an electrotechnical regulation of the rotational speed of the rotary field electromotive force. In doing so, the regulating device can be designed for a setpoint representing a stator rotary field frequency, wherein the stator rotary field frequency usually corresponds to a network frequency. In this case, a network frequency can particularly be a standard frequency of 50 Hz or 60 Hz. In principle, any other or any varying frequency in the form of the stator rotary field frequency can be achieved.

Advantageous improvements of the invention can be seen from the dependent claims and specify in detail advantageous possibilities for realizing the concept according to the invention with regard to its essential advantages and further advantageous embodiments.

Particularly preferably, the regulating device is at least connected to the generator by one regulating device connection and to the frequency converter by one regulating device connection, which is designed to transmit the measuring values from the generator to the regulating device and to transmit a control signal, in particular a current control signal, from the regulating device to the frequency converter. The background to this is that, as part of the general concept, an adjustment of the frequency of the rotary field magnetomotive force to achieve a predetermined stator rotary field frequency is to be achieved predominantly by adjusting the rotor rotary field frequency.

In particular, the regulating device for this is designed in the form of a "field oriented" regulating device. In this context, "field oriented" means that in particular the relevant magnetic fluxes within the generator are simulated by means of an appropriate system of differential equations. The recording of measuring values relates in particular to measuring values such as stator currents and voltages. The recording of measuring values can now basically be restricted to the stator. In doing so, it would be possible to simulate a rotor. Preferably, however, measuring values such as rotor currents and voltages as well as a rotor speed or acceleration can also be recorded. If necessary, rotor measuring values can also be used in addition to or as an alternative to stator measuring values to support or simplify a simulation. The regulating device processor is designed for a machine simulation in order to specify an appropriate control signal, which specifies an electrical excitation of the rotor winding in such a way that the rotary field magnetomotive force produced by said excitation leads to a predetermined stator rotary field frequency.

In particular, the generator is electrically connected to a network connection in order to connect to a network. In particular, the frequency converter is connected, if necessary by means of transformer, to the network connection in order to provide power to the frequency converter. The transformer must be rated according to the network voltage and power of the generating unit or of the frequency converter (inverter) respectively and can also be omitted if necessary.

Preferably, the frequency converter is connected to the rotor winding by means of a slip-ring connector. Advantageously, a slip-ring connector can be matched to the specific characteristics of a rotating rotor in operation.

The rotor winding is preferably designed in the form of a three-phase winding, and the rotor has a ferromagnetic hollow body, preferably in the form of a laminated core. Against the background that, unlike a rotor of a purely synchronous machine, eddy currents can occur as a result of the alternating flux provided in the new concept, the eddy currents are kept small by means of laminations of the laminated core, which are insulated with respect to one another.

The drive is preferably designed in the form of a turbine and/or a flywheel. The flywheel can sit on a drive shaft, for example, and thus increase the mass of the shaft. In this way, energy can be buffered and taken off in the event of a peak network load, for example. If necessary, the drive can be formed exclusively by the flywheel. By decoupling the drive speed from the network frequency, the kinetic energy stored in the shaft train can be fully utilized in a controlled manner, namely in the event of short-term load peaks.

This is particularly advantageous with generating units as part of a decentral power supply, for example with generating units, which are to supply an island network. The use of such a unit specially for supporting a network is also conceivable. Particularly in the case where the generating unit acts as a pure energy store, the flywheel could replace the drive.

As part of a particularly preferred improvement of the generating unit, the width of an air gap between rotor and stator lies between 1 cm and 8 cm. While namely, in the case of asynchronous machines, the air gap generally lies in the range of a few millimeters and in the case of synchronous machines can be greater than 10 cm, the air gap set within the framework of the improvement takes into account the special design of the generator of the present concept in variable frequency operation. On the one hand, reactions by the stator on the field are prevented, and on the other hand a reactive power is kept as low as possible as a result of the presently optimized air gap.

In principle, the generating unit according to the new concept is suitable for large powers, for which gearbox solutions for decoupling drive and generator speed were previously not possible or were inefficient. The present concept also proves to be particularly advantageous in the lower power range, i.e. preferably with a power below less than 100 MW, in particular below 10 MW, in particular below 1 MW. With this power range, the generating unit proves to be advantageous above all for supplying a test field. Preferably, rotor voltages below 1 kV and a stator voltage above 10 kV can be produced in this power range in this way. An application is also advantageous in which rotor voltages lie below 5 kV and/or stator voltages lie above 10 kV.

BRIEF DESCRIPTION OF THE DRAWINGS

An exemplary embodiment of the invention is described below with reference to the drawing. This is not intended to represent the exemplary embodiment definitively, but rather, where beneficial for explanation, the drawing is shown in schematized and/or slightly distorted form. Reference is made to the relevant prior art with regard to supplementation of the teaching that is immediately evident from the drawing. In detail, in the drawing:

FIG. 1 shows a schematic of a particularly preferred embodiment of the generating unit according to the new concept;

FIG. 2 shows two schematics clarifying super-synchronous and sub-synchronous operation, which show the interaction of rotational frequency n of the drive, rotor rotary field frequency $f_2$, stator rotary field frequency $f_1$, and the number of pairs of poles p.

DETAILED DESCRIPTION OF INVENTION

FIG. 1 shows a generating unit 1 with a drive 3, which here is constructed in the form of a turbine 5 and an additional flywheel 7. The drive 3 drives a generator 11 via a shaft train 9 with variable rotational frequency n. Here, the rotational frequency n is the frequency of rotation of the shaft train 9. The generator 11 is formed by a stator 13 and a rotor 15, the rotor 15 being coupled directly, i.e. without gearing, to the shaft train 9, and likewise rotating at variable rotational frequency n. That is to say, according to the preferred embodiment, the drive 3 is designed with variable rotational frequency n for driving the rotor 15.

In a conventional generator designed as a synchronous machine, this would lead in the case of a two-pole machine (number of pairs of poles p=1) to the rotational frequency n being equal to the stator rotary field frequency $f_1$, as with conventional synchronous machines a stationary rotary field magnetomotive force is produced in relation to the rotor 15, which, in the same way as the rotor 15, rotates with the rotor, i.e. with the rotational frequency n.

Unlike conventional synchronous machines of this kind, in the case of the preferred embodiment of a generating unit 1 shown here, the rotor 15 is provided with a rotor winding 17 shown symbolically, which is constructed in the form of a three-phase winding and identified by the symbol "3~". That is to say, the rotor winding is embodied in such a way as to produce a rotary field magnetomotive force of the generator 11 with a rotor rotary field frequency $f_2$ which is variable in relation to the rotor. In a similar way to the production of three-phase current, in practice, a kind of "coil arrangement" can be carried out for the rotor winding 17, which, with appropriate excitation with current and/or voltage, produces a rotating magnetic rotary field (excitation field) relative to the rotor 15 with the rotor rotary field frequency $f_2$. This leads to a rotary field magnetomotive force of the generator 11, which has a stator rotary field frequency $f_1$ relative to the stator 13. The stator rotary field frequency expediently corresponds to the predetermined constant or variable network frequency. If the network frequency is constant, the drive 3 and the generator 11 can be particularly expediently designed independently of one another. If the network frequency is variable, the stator rotary field frequency can be tracked.

An accordingly carried out electrical excitation of the rotor winding 17 is undertaken by a frequency converter 19, which is electrically connected by means of an electrical connection and a slip-ring connector 14 to the rotor winding 17 for this purpose. The slip-ring connector 14 and the electrical connection 21 are, as shown by three sloping lines in FIG. 1, designed for three legs of the rotor winding 17, which is designed as a rotating current winding for three phases. At a frequency $f_2$ corresponding to the rotor rotary field frequency, the electrical power can be provided by the frequency converter at variable rotor rotary field frequency $f_2$. The power is drawn by the frequency converter 19 from the network, which is not shown in more detail. The frequency converter 19 is connected to a network connector 25 by means of a transformer 23 for this purpose. Here, unlike the rotor rotary field frequency $f_2$, the network frequency corresponds to the stator rotary field frequency $f_1$ so that the frequency converter 19 undertakes a conversion from the network frequency $f_1$ to the rotor rotary field frequency $f_2$. In the embodiment shown here, the conversion takes place only at the voltage level of the rotor winding, in this case namely at 500 V. On the other hand, the power output of the stator 13 takes place at a voltage level of 10 kV, which corresponds to the network voltage. According to the new concept, with the particularly preferred embodiment of a generating unit 1 shown in FIG. 1, a frequency conversion is therefore only to be carried out at the voltage level of the rotor (500 V). In contrast to this, conventional concepts would have to convert the frequency of the whole generator power, which here lies at a voltage level of 10 kV. Advantageously, with the particularly preferred embodiment of a generating unit 1 shown here, the frequency converter 19 can therefore be designed in a particularly compact and cost-effective manner. A transformer 23 carries out the voltage transformation from network voltage at 10 kV to rotor voltage at 500 V, which is necessary for this embodiment, and is connected between the network connector 25 and the frequency converter 19 for this purpose.

For converting the frequency, the frequency converter 19 preferably has an input converter, an energy-storing link circuit and an output converter. The energy-storing link circuit can preferably be designed in the form of a capacitor or a choke coil. Furthermore, the frequency converter 19 has means for field-oriented excitation of the rotor winding 17. For this purpose, the frequency converter 19 has appropriate semiconductor valves, which ensure that the correct phase of an appropriate leg of the three-phase rotor winding 17 is excited.

The present generating unit therefore provides a variable electrical excitation of the rotor winding 17 by the frequency converter 19 in such a way that a predetermined and here extensively constant stator rotary field frequency $f_1$ is present in the event of a variable rotational frequency n of the rotor 15 and a variable rotor rotary field frequency $f_2$ in relation to the rotor 15. If necessary, the predetermined or specified stator rotary field frequency $f_1$ can also be transient or slightly transient, particularly in the case of smaller networks. The stator rotary field frequency $f_1$ therefore constitutes a comparatively constant control variable. For this purpose, a variable electrical excitation of the rotor winding 17, which is predetermined by a regulating device, has been calculated by a regulating device 27 designed for the purpose. This has a symbolically shown recording element 29 for measuring values of the generator 11, which are recorded by means of a sensor 31 on the generator 11. The measuring values are transmitted by means of a regulating device connection 33 at least from the stator and, if required, also from the rotor 15 to the regulating device 27. Furthermore, the regulating device 27 has a calculating unit 35 for simulating the generator 11. By simulating all magnetic fluxes occurring in the generator 11 in accordance with a differential equation model designed for the purpose, a control signal, which is not shown in more detail, is provided in the output 37 of the regulating device 27, said signal being transmitted to the frequency converter 19 by means of a further regulating device connection 39. By virtue of the control signal, a field oriented excitation of the rotor winding 17 as described above takes place, which is such that a predetermined stator rotary field frequency $f_1$ is present in the event of a variable rotational frequency n of the rotor 15 and a variable rotor rotary field frequency $f_2$.

In the case of the particularly preferred embodiment of a generating unit 1 shown in FIG. 1, it is pointed out by way of example that this generating unit 1 can be used advantageously for producing high voltages in the range of 10 kV, the voltages at the rotor winding being comparatively low (500 V). Therefore, with a comparatively low power, a test field, for example, can be set up with varying voltage.

Furthermore, the generating unit 1 is also suitable for use as a peak-load device or as an individual network supply unit. In this case, the flywheel 7 as part of the drive 3 is particularly advantageous as an energy buffer. In this case, the power of the generating unit, which is otherwise also suitable for higher powers, can for all intents and purposes be below 10 MW in order to feed an island network as part of a decentralized supply.

An air gap between rotor and stator, which lies well above an air gap of conventional asynchronous machines, but on the other hand lies below air gaps of conventional synchronous machines, has proved to be advantageous for the design of the generator 11, which is provided with rotary field magnetomotive force produced at variable rotor rotary field frequency $f_1$. A width of such an air gap between rotor and stator advantageously lies between 1 cm and 8 cm. With the particularly preferred embodiment of a generating unit 1 shown in FIG. 1, an air gap between 2 cm and 4 cm takes into account the design of the generating unit 1 for a rotor voltage of 500 V and a stator voltage of 10 kV at an appropriate rotor rotary field frequency $f_2$ and a stator rotary field frequency $f_1$.

By way of explanation, FIG. 2 shows the interaction of the different frequency data used with reference to FIG. 1 relative to the shaft train 9 or relative to the rotor 15. In super-synchronous operation (FIG. 2A), power is supplied by the frequency converter 19 to the rotor winding 17. The rotor rotary field, which leads to rotary field magnetomotive force, rotates in the opposite direction to the rotor 15 at the rotor rotary field frequency $f_2$. This leads to a stator rotary field frequency $f_1$, which lies below the rotational frequency n of the shaft train 9 or the rotor 15.

In sub-synchronous operation, power is taken by the frequency converter 19 from the rotor winding 17. The rotor rotary field, which leads to rotary field magnetomotive force, rotates in the same direction as the rotor at the rotor rotary field frequency $f_2$ with respect to the rotor 15. This leads to the stator rotary field frequency $f_1$ lying above the rotational frequency n of the shaft train 9 or the rotor 15. By means of a control of the frequency converter 19 carried out by virtue of the regulating device 27, with changing variable rotational frequency n (FIG. 2A, FIG. 2B) it is therefore possible to provide a rotor rotary field frequency $f_2$, which is likewise variable and matched thereto (FIG. 2A, FIG. 2B) in such a way that the stator rotary field frequency $f_1$ has a predetermined or specified value and, in particular, is comparatively constant. Depending upon the number of pairs of poles, this provides a stator rotary field frequency $f_1$ as a multiple or fraction of the network frequency.

In previously common methods for generating current, a generator 11 working as a synchronous machine is provided as part of a generating unit 1, which necessarily rotates at a constant speed coupled to the network frequency. As a result, both a variable design of the turbine 5 and the generator 11 are restricted. In order to be able to decouple the drive 3 and the generator 11 at a constant network frequency, a generating unit 1 comprising a drive 3, a generator 11 with a stator 13 and a rotor 15 and a frequency converter 19 is provided in which, according to the invention, the drive 3 is embodied in such a way as to drive the rotor 15 at a variable rotational frequency n; the rotor 15 has a rotor winding 17 that is embodied in such a way as to produce a rotary field magnetomotive force of the generator 11 with a rotor rotary field frequency $f_2$ which is variable in relation to the rotor 15; the frequency converter 19 is electrically connected to the rotor winding 17; a regulating device 27 comprising a recording element 29 for measuring values of the generator 11, a calculating unit 35 for a generator simulation, and a transmitter 37 for transmitting a control signal to the frequency converter 19 is provided; and, on the basis of the control signal, an electrical excitation of the rotor winding 17 can be triggered by the frequency converter 19 in such a way that a predetermined stator rotary field frequency $f_1$ is present in the event of a variable rotational frequency n of the rotor 15 and a variable rotor rotary field frequency $f_2$. A method for producing current with a predetermined network frequency is also specified.

The invention claimed is:

1. A generating unit comprising:
   a generator having a stator with an axial opening therein, and a rotor comprising a rotor winding disposed and rotating within the axial opening, the rotor winding for producing a rotor rotary field magnetomotive force having a rotor rotary field frequency which is variable in relation to the rotor rotational frequency, wherein the width of a radial air gap between the rotor and an inside surface of the axial opening is between 1 cm and 8 cm;
   a drive that drives the rotor at a variable rotational frequency (n);
   a frequency converter electrically connected to the rotor winding; and
   a regulating device comprising:
      a recording element for measuring operational values of the generator,
      a calculating unit for simulating generator operation using measured operational values,
      a controller for generating a control signal responsive to the calculating unit, and
      a transmitter for transmitting the control signal to the frequency converter, wherein on the basis of the control signal the frequency converter adjusts the rotor rotary field frequency such that a constant stator rotary field frequency is maintained in the event of a variable rotor rotational frequency, the control signal determined according to the equation $$n=(f_1+f_2)/p$$

where $f_1$ is the stator rotary field frequency, $f_2$ is the rotor rotary field frequency, n is the variable rotational frequency of the rotor, and p is a number of generator poles.

2. The generating unit as claimed in claim 1, wherein the regulating device is at least connected to the generator by at least one regulating device connection and to the frequency converter by at least one regulating device connection, which is designed to transmit the operational values from the generator to the regulating device and to transmit a control signal from the regulating device to the frequency converter.

3. The generating unit as claimed in claim 1, wherein the regulating device simulates relevant magnetic fluxes within the generator using differential equations to generate the control signal.

4. The generating unit as claimed in claim 1, wherein the generator is electrically connected to a network connection.

5. The generating unit as claimed in claim 1, wherein the frequency converter is electrically connected to a network connection.

6. The generating unit as claimed in claim 1, wherein the frequency converter is electrically connected to the network connection by a transformer.

7. The generating unit as claimed in claim 1, wherein the frequency converter is connected to the rotor winding by a slip-ring connector.

8. The generating unit as claimed in claim 1, wherein the rotor winding is a three-phase winding, and the rotor has a ferromagnetic hollow laminated core body.

9. The generating unit as claimed in claim 1, wherein the drive is a turbine and/or a flywheel.

10. The generating unit as claimed in claim 1, wherein the generating unit is designed for power output below 100 MW.

11. The generating unit as claimed in claim 1, wherein the generating unit is designed for power output below 10 MW.

12. The generating unit as claimed in claim 1, wherein the generating unit is designed for power output 1 MW.

13. The generating unit as claimed in claim 1, wherein the generating unit is designed for a rotor voltage below 1 kV and a stator voltage above 10 kV.

14. The generating unit as claimed in claim 1, wherein the generating unit is a peak-load device.

15. The generating unit as claimed in claim 1, wherein the generating unit is an individual network supply unit.

* * * * *